United States Patent
Kim et al.

(10) Patent No.: US 9,185,131 B2
(45) Date of Patent: Nov. 10, 2015

(54) METHOD AND APPARATUS FOR BLOCKING MALICIOUS ACCESS TO PROCESS

(75) Inventors: Yunseock Kim, Seoul (KR); Jaegap Yang, Gyeonggi-do (KR); Hanju Kim, Gyeonggi-do (KR)

(73) Assignee: AHNLAB, INC., Gyeonggi-Do (KR)

( * ) Notice: Subject to any disclaimer, the term of this patent is extended or adjusted under 35 U.S.C. 154(b) by 176 days.

(21) Appl. No.: 13/883,351

(22) PCT Filed: Nov. 3, 2011

(86) PCT No.: PCT/KR2011/008324
§ 371 (c)(1),
(2), (4) Date: May 3, 2013

(87) PCT Pub. No.: WO2012/060639
PCT Pub. Date: May 10, 2012

(65) Prior Publication Data
US 2013/0227686 A1    Aug. 29, 2013

(30) Foreign Application Priority Data
Nov. 3, 2010 (KR) .................. 10 2010 0108762

(51) Int. Cl.
*G06F 21/52* (2013.01)
*H04L 29/06* (2006.01)

(52) U.S. Cl.
CPC ............ *H04L 63/1466* (2013.01); *G06F 21/52* (2013.01)

(58) Field of Classification Search
None
See application file for complete search history.

(56) References Cited

U.S. PATENT DOCUMENTS

| | | |
|---|---|---|
| 2005/0166209 A1* | 7/2005 | Merrick et al. ............... 719/310 |
| 2008/0313417 A1 | 12/2008 | Kim et al. |
| 2009/0100517 A1 | 4/2009 | Kim et al. |
| 2011/0283366 A1 | 11/2011 | Kwon et al. |

FOREIGN PATENT DOCUMENTS

| | | | |
|---|---|---|---|
| KR | 1020090037789 | 4/2009 | |
| KR | 1020090111577 | 10/2009 | |
| KR | 1020100049258 | 5/2010 | |
| WO | 2009131371 | 10/2009 | |
| WO | WO 2010062063 A2 * | 6/2010 | ............. G06F 21/00 |

* cited by examiner

*Primary Examiner* — Benjamin Lanier
*Assistant Examiner* — Malcolm Cribbs
(74) *Attorney, Agent, or Firm* — Bacon & Thomas, PLLC

(57) ABSTRACT

An apparatus for blocking an external access to a browser includes an access monitor for monitoring whether a program is accessing the browser; and a document-object acquisition detector for detecting whether the program detected to access the browser by the access monitor acquires a document object of the browser; and an injection blocker for blocking the access of the program to the browser when the document object acquisition detector detects the document object acquisition by the corresponding program.

9 Claims, 2 Drawing Sheets

METHOD AND APPARATUS FOR BLOCKING MALICIOUS ACCESS TO PROCESS

TECHNICAL FIELD

The present invention relates to a technique to block an external access to a process.

More particularly, the present invention relates to an apparatus and method for blocking a malicious external access to a browser running on a client system and relates to a computer-readable storage medium in which a computer executable instructions capable of executing the method for blocking an external access to a process is included.

BACKGROUND ART

As is well known, an HTML injection of a web or WAP page (hereinafter collectively referred to as a "HTML page") refers to an action maliciously faking a file information in the HTML page or replacing the file information in the HTML page with an entirely new false information on a network. This action may be variously motivated by, e.g., making a financial profit, a pure curiosity about hacking a network, and so on.

In a prior art, an anti HTML injection, which is a technique to block the HTML injection, has been implemented in a server side and a network side. A typical example of the anti HTML injection includes an agent system installed in the server.

Such an agent system generates an agent using a java applet, which can be automatically downloaded into a browser of an approaching user, and causes the agent to transmit information about the approaching user via a socket within the agent. The server detects the original location of a trespasser concealing one's location by comparing HTTP (Hyper Text Transfer Protocol) header information for the approaching user and the trespasser accessing the server to trace the trespasser. Also, the server can pursue an intermediate route through the HTTP header information. The HTTP header information received from the agent can also be used to pursue a malicious user who uploads an unfair data or reply in a storage room or a notice board. In addition, the HTTP header information can also be used to prevent the access of a user who intends to conceal his or her information by using intermediate routes.

However, the above-mentioned agent system greatly affects availability of the server. Recently, there occurs an event to attack a web page of a financial agency through the use of a separate HTML injection technique, in which it renders the HTML page to fake by accessing a client side. Nevertheless, the existing anti HTML injections cannot protect itself from the direct attack from the client side through the HTML injection.

DISCLOSURE OF INVENTION

Technical Problem

In view of the above, the present invention provides an apparatus and method for blocking a malicious external access to a browser running on a client system.

Further, the present invention provides a computer-readable storage medium in which a computer executable instruction capable of executing the method of blocking an external access to a process is included.

Solution to Problem

In accordance with the present invention, there is provided an apparatus for blocking an external access to a browser, the apparatus including: an access monitor for monitoring whether a program is accessing the browser; a document-object acquisition detector for detecting whether the program monitored by the access monitor acquires a document object of the browser; and an injection blocker for blocking the access of the program to the browser when the document object acquisition detector detects the document object acquisition by the corresponding program.

Preferably, the access monitor monitors the access of the program in an RPC process to be executed by the program which has accessed to a DOM (Document Object Model) interface of the browser.

Preferably, an access of the program to the browser is detected by hooking an entry point function of the RPC process.

Preferably, the document-object acquisition detector detects the acquisition of the document object of the browser by identifying an interface ID (Identify) of the program accessing the browser.

Preferably, the injection blocker includes: a program list storage for storing a program list of a plurality of programs; and a blocking determination unit for comparing the program having the acquisition of the document object, with programs in the program list, to selectively block the access of the program to the browser on the basis of the comparison result.

Preferably, the program list includes titles of the programs allowed to access the browser.

In accordance with the present invention, there is provided a method for blocking an external access to a browser, the method including: monitoring whether a program is accessing the browser; detecting whether the program accessing the browser acquires a document object of the browser; and blocking the access of the program to the browser when the document object acquisition is detected.

Preferably, said monitoring whether a program is accessing the browser includes monitoring an access of the program to the browser in an RPC process to be executed by the program which has accessed to a DOM (Document Object Model) interface of the browser.

Preferably, the access of the program to the DOM interface is detected by hooking an entry point function of the RPC process.

Preferably, said detecting whether the program accessing the browser acquires a document object of the browser includes detecting the acquisition of the document object by identifying an interface ID (Identifier) of the program accessing the browser.

Preferably, said blocking the access of the program to the browser includes: fetching a program list; and comparing the program having the acquisition of the document object with programs in the program list to selectively block the access of the program to the browser on the basis of the comparison result.

Preferably, the program list includes titles of programs allowed to access the browser.

In accordance with the present invention, there is provided a computer-readable storage medium comprising computer executable instructions to cause a data-processing system to carry out the method for blocking an external access to a browser as described above.

BRIEF DESCRIPTION OF DRAWINGS

The above and other objects and features of the present invention will become apparent from the following description of embodiments given in conjunction with the accompanying drawings, in which.

BEST MODE FOR CARRYING OUT THE INVENTION

Hereinafter, embodiments of the present invention will be described in detail with reference to the accompanying drawings so that they can be readily implemented by those skilled in the art.

Figure 1:
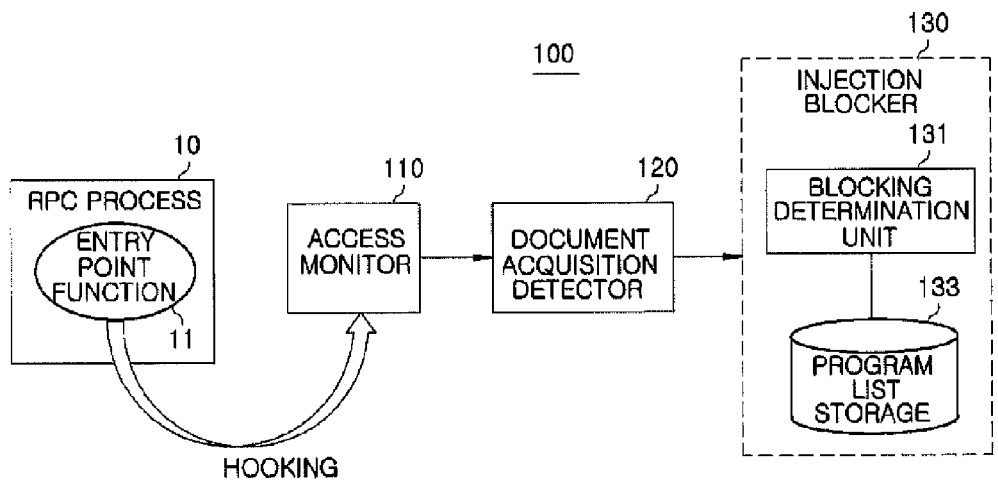
FIG. 1 is a block diagram showing an apparatus for blocking a malicious external access in accordance with an embodiment of the present invention.

FIG. 1 is a block diagram showing an apparatus for blocking a malicious external access to a process in accordance with an embodiment of the present invention. As shown in this drawing, the apparatus 100 for blocking an external access to a process includes an access monitor 110, a document-object acquisition detector 120 and an injection blocker 130.

The access monitor 110 monitors whether a program is accessing a browser running on a client side. More specifically, the access monitor 110 monitors an access of a program in an RPC (Remote Procedure Call) process 10 to be adversely executed by the program which has accessed to a DOM (Document Object Model) interface of the browser to detect the access of the program to the browser. In this embodiment, the access monitor 110 detects the access of the program by hooking an entry point function 11 of the RPC process 10, for example an API (Application Program Interface) function of "NdrStubCall2".

The client system may be implemented as a mobile telephone, a smart phone, a handheld computer, a personal digital assistant (PDA), a notebook or laptop computer, or any other computing device that has been modified or fabricated to include the functionality of the present invention.

The document-object acquisition detector 120 detects whether or not the program, determined by the access monitor 110 to have accessed the browser, acquires a document object of the browser. For example, the document-object acquisition detector 120 detects an acquisition of a document object by the program accessing the browser by identifying an interface ID (Identifier) of the program. In this embodiment, when the interface ID of the program has any one of the values IID_IHTMLInputElement, IID_IHTMLElement, IID_IHTMLDocument2, IID_IConnectionPointContainer, IID_IHTMLWindow2, IID_KHTMLDOMNode, IID_IDispatch and IID_WebBrowser2, it is determined that the program has acquired a document object of the browser.

The injection blocker 130 blocks the access of the program to the browser when the document-object acquisition detector 120 detects the document object acquisition by the program. To this end, the injection blocker 130 includes a blocking determination unit 131 and a program list storage 133 which stores a list of a plurality of programs. The blocking determination unit 131 compares programs in the program list with the program whose acquisition of the document object has been detected by the document-object acquisition detector 120. The blocking determination unit 131 then selectively blocks the program from accessing the browser depending on the comparison result. The program list stored in the program list storage 133 may include titles of programs to be allowed to access the browser, and titles of programs to be denied to access the browser.

Figure 2:
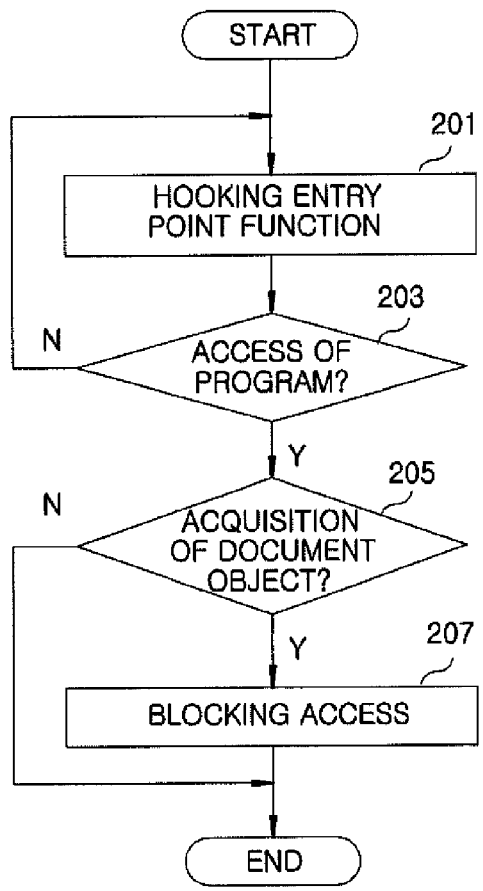
FIG. 2 is a flow chart illustrating a first embodiment of a method for blocking a malicious external access performed by the apparatus of FIG. 1.

FIG. 2 is a flow chart illustrating a first embodiment of a method for blocking an external access to a process performed by the apparatus shown in FIG. 1. As shown in FIG. 2, the first embodiment of the method for blocking an external access to a process includes steps of: monitoring whether a program is accessing a browser running on a client system (in steps 201 and 203); detecting whether a document object of the browser is acquired by the program which has been monitored to have accessed the browser (in step 205); and blocking the program when the document object acquisition of the browser by the program has been detected (in step 207).

The first embodiment of the method for blocking an access of a program to a process in accordance with the present invention will now be described in detail with reference to FIGS. 1 and 2.

A malicious program must obtain document information of an HTML page, in order to fake the HTML page, seize or falsify a cookie value, or perform its scripts. To get the document information, the malicious program must access a DOM (Document Object Model) interface of the browser and go through an RPC (Remote Procedure Calls) performed between processes. In view of this point, the apparatus 100 allows the access monitor 110 to monitor whether a program is accessing the browser in a client system, in order to block a faking of the HTML page, such as an HTML injection, through an access to the process, for example, an access to a COM (Component Object Model) interface of the client system. More specifically, the access monitor 110 monitors an access of the program in the RPC process which can be performed by the program through accessing the DOM interface of the browser. To this end, the access monitor 110 hooks an entry point function, such as an API function of "NdrStubCall2", being used in the RPC process in step 201 and monitors the access of the program by using the hooked entry point function in step 203.

If it is determined that an access of the program to the browser is detected by the access monitor 110, in step 205, the document-object acquisition detector 120 detects whether the program detected to have accessed the browser obtains a document object of the browser. For example, if an interface ID of the program that has accessed the browser is the same as one of IID_IHTMLInputElement, IID_IHTMLElement, IID_IHTMLDocument2, IID_IConnectionPointContainer, IID_IHTMLWindow2, IID_KHTMLDOMNode, IID_IDispatch and IID_WebBrowser2, the document-object acquisition detector 120 determines that the program is acquiring a document object of the browser.

When the document-object acquisition by the program is determined by document-object acquisition detector 120, the injection blocker 130 blocks the access of the program to the browser in step 207.

Accordingly, it is possible to prevent in advance security risks such as a HTML injection, seizure or falsification of a cookie value, and an execution of external script, which are performed through the access of malicious external programs to the DOM interface of an externally exposed browser.

Figure 3:
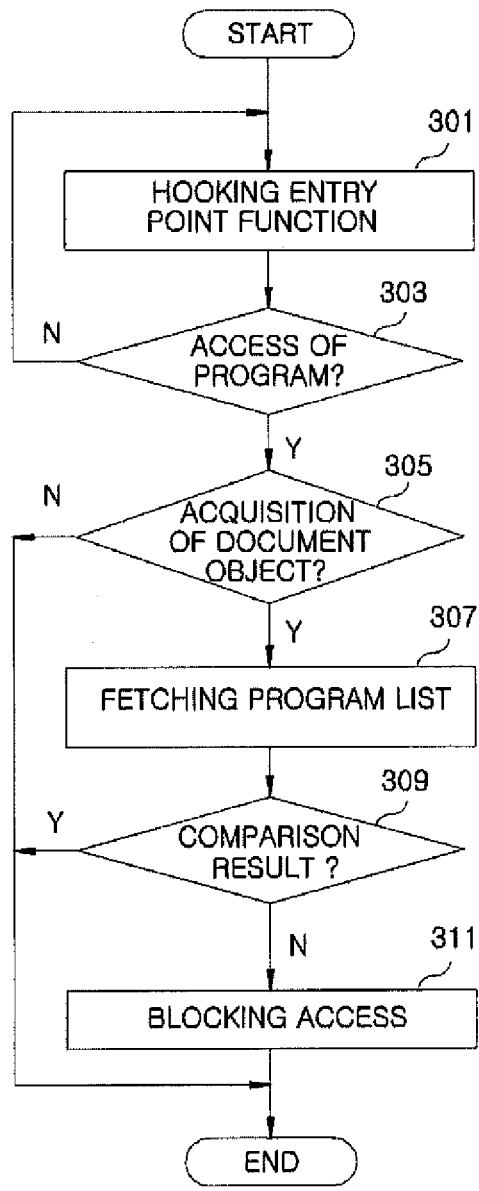
FIG. 3 is a flow chart illustrating a second embodiment of a method for blocking a malicious external access performed by the apparatus of FIG. 1.

FIG. 3 is a flow chart illustrating a second embodiment of a method for blocking an external access to a process performed by the apparatus shown in FIG. 1.

As shown in FIG. 3, the second embodiment of the method of blocking an external access to a process includes: monitoring whether an external program is accessing a browser running on a client system (in steps 301 and 303); detecting whether a document object of the browser is acquired by the external program which has been detected to have accessed the browser through monitoring (in step 305); fetching previously stored a program list (in step 307); and comparing the external program, which has been detected to acquire the document object, with programs in the loaded program list and selectively blocking the external program from accessing to the browser on the basis of the comparison result (in steps 309 and 311).

The second embodiment of the method for blocking a program to a process will be explained in detail with reference to FIGS. 1 and 3.

The apparatus 100 allows the access monitor 110 to monitor whether a program is accessing a browser in a client system, in order to block a faking of the HTML page, such as an HTML injection, from an access to a process, for example, an access to a COM (Component Object Model) interface of the client system. More specifically, the access monitor 110 monitors an access of the program in the RPC process which can be performed by the program through accessing the DOM interface of the browser. To this end, the access monitor 110 hooks an entry point function, such as an API function of "NdrStubCall2", being used in the RPC process in step 301, and monitors the access of the program based on the hooked entry point function in step 303.

If it is determined that an access of the program to the browser is detected by the access monitor 110, in step 305, the document-object acquisition detector 120 detects whether the program detected to have accessed the browser obtains a document object of the browser. For example, if an interface ID of the program that has accessed the browser is the same as one of IID_IHTMLInputElement, IID_IHTMLElement, IID_IHTMLDocument2, IID_IConnectionPointContainer, IID_IHTMLWindow2, IID_KHTMLDOMNode, IID_IDispatch and IID_WebBrowser2, the document-object acquisition detector 120 determines that the program is acquiring a document object of the browser.

When the document object acquisition of the program is determined by document-object acquisition detector 120, the blocking determination unit 131 of the injection blocker 130 fetches the program list stored in the program list storage 133 in step 307 and compares the program, which has acquired the document object, with the programs in the program list in step S309. After that, the blocking determination unit 131 selectively blocks the access of the program to the browser on the basis of the comparison result, in step S311. For example, if the program list stored in the program list storage includes titles of programs allowed to access the browser, a program corresponding to one of the program titles in the list may be permitted to access the browser, but another program not corresponding to any one of the program titles in the list may be thoroughly blocked from accessing the browser.

Accordingly, this allows to prevent in advance security risks such as a HTML injection, seizure or falsification of a cookie value, and an external script execution, which are performed through the access of malicious external programs to the DOM interface of an externally exposed browser.

The above-mentioned method for blocking an external access to a process may be implemented through computer programs. Codes and code segments configuring each of the computer programs can be easily derived by a skilled computer programmer in this art. The computer programs are stored in a computer-readable medium. As such, the computer programs can be read and executed by a computer or the process external-access-blocking apparatus in accordance with the embodiments of the present invention, so that the method for blocking an external access to a process is realized. The computer-readable medium includes a magnetic recording medium, an optical recording medium, a carrier wave medium, and others.

In accordance with the embodiments of the present invention, an access of a malicious external program to a process can be blocked in advance in the client system such that security risks such as a HTML injection, seizure or falsification of a cookie value, and an external script execution, which are performed through the access of the external programs to the browser, can be effectively prevented.

While the invention has been shown and described with respect to the preferred embodiments, it will be understood by those skilled in the art that various changes and modifications may be made without departing from the scope of the invention as defined in the following claims.

The invention claimed is:

1. An apparatus for blocking an external access to a browser, the apparatus comprising processor programmed with instructions that, when executed, cause the processor to:
  monitor whether an external program outside the browser is accessing a DOM (Document Object Model) interface of the browser through an entry point of the browser using a Remote Procedure Call (RPC) protocol;
  detect, upon hooking an entry point function of the RPC protocol, whether the external program being monitored has acquired a document object of the browser; and
  block the access of the program to the browser when a document object acquisition by the corresponding program is detected.

2. The apparatus of claim 1, wherein the instructions to cause the processor to detect acquisition of the document object of the browser detects the acquisition of the document object by identifying an interface ID (Identifier) of the program accessing the browser.

3. The apparatus of claim 1, wherein the processor is further programmed with instructions to:
  store a program list of a plurality of programs; and
  compare the program having the acquisition of the document object with programs in the program list to selectively block the access of the program to the browser on the basis of the comparison result.

4. The apparatus of claim 3, wherein the program list includes titles of the programs allowed to access the browser.

5. A method for blocking an eternal access to a browser, the method being performed by a processor programmed with instructions that, when executed, cause the processor to steps of the method, the method including:
  the processor monitoring whether an external program outside the browser is accessing the browser through an entry point of the browser using a Remote Procedure Call (RPC) protocol;
  the processor detecting, upon hooking an entry point function of the RPC protocol upon access of the external program to a DOM (Document Object Model) interface of the browser, whether the program accessing the browser acquires a document object of the browser; and
  the processor blocking the access of the external program to the browser when the document object acquisition is detected.

6. The method of claim 5, wherein said detecting whether the program accessing the browser acquires a document object of the browser includes the processor detecting the acquisition of the document object by identifying an interface ID (Identify) of the program accessing the browser.

7. The method of claim 5, wherein said blocking the access of the program to the browser includes:
  the processor fetching a program list; and
  the processor comparing the program having the acquisition of the document object with programs in the program list to selectively block the access of the program to the browser on the basis of the comparison result.

8. The method of claim 7, wherein the program list includes titles of the programs allowed to access the browser.

9. A non-transitory computer-readable storage medium comprising computer executable instructions to cause a data-processing system to carry out the steps to:
- monitor whether an external program outside the browser is accessing a DOM (Document Object Model) interface of the browser through an entry point of the browser using a Remote Procedure Call (RPC) protocol;
- detect, upon hooking an entry point function of the RPC protocol, whether the external program being monitored has acquired a document object of the browser; and
- block the access of the program to the browser when a document object acquisition by the corresponding program is detected.

* * * * *